United States Patent [19]

Asai et al.

[11] Patent Number: 4,859,074
[45] Date of Patent: Aug. 22, 1989

[54] CLOSED MIXING MACHINE

[75] Inventors: Toshihiro Asai; Katsunobu Hagiwara, both of Kobe, Japan

[73] Assignee: Kabushiki Kaisha Kobe Seiko Sho, Kobe, Japan

[21] Appl. No.: 82,218

[22] Filed: Aug. 6, 1987

Related U.S. Application Data

[63] Continuation-in-part of Ser. No. 896,962, Aug. 15, 1986, Pat. No. 4,718,771.

[30] Foreign Application Priority Data

Aug. 22, 1985 [JP] Japan .................................. 60-184506

[51] Int. Cl.$^4$ ............................ B29B 1/06; B28C 1/16
[52] U.S. Cl. ......................................... 366/97; 366/300
[58] Field of Search ........................ 366/83, 84, 85, 97, 366/297, 298, 299, 300, 301; 425/207, 208, 209, 204, 205

[56] References Cited

U.S. PATENT DOCUMENTS

| | | | |
|---|---|---|---|
| 2,535,647 | 12/1950 | Millman | 366/97 |
| 3,230,581 | 1/1966 | Tyson | 366/97 |
| 4,113,822 | 4/1978 | Takiura | 366/85 |
| 4,284,358 | 8/1981 | Sato | 366/97 |
| 4,300,838 | 11/1981 | Sato | 366/97 |
| 4,456,381 | 6/1984 | Inoue | 366/97 |
| 4,474,475 | 10/1984 | Moriyama | 366/97 |
| 4,714,350 | 12/1987 | Nortey | 366/84 |

Primary Examiner—Robert W. Jenkins
Attorney, Agent, or Firm—Oblon, Spivak, McClelland, Maier & Neustadt

[57] ABSTRACT

A closed mixing machine includes a pair of nonintermeshed rotors rotatable in chambers at a predetermined differential rotation ratio and having respective rotor tips set at a predetermined differential phase angle. The predetermined differential rotation ratio is set to be 1.0 and the predetermined differential phase angle is set to be 0 to 45 degrees so that the mixing machine performs improved macro-dispersion.

3 Claims, 7 Drawing Sheets

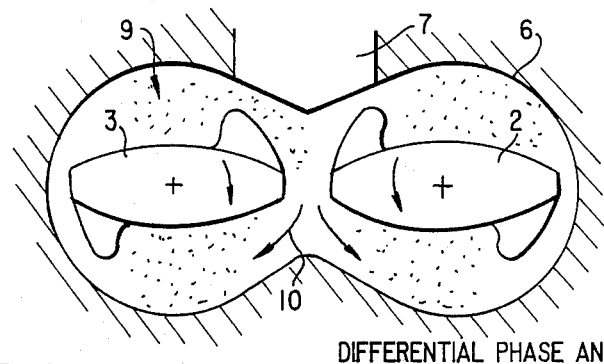
FIG. 2A PRIOR ART  DIFFERENTIAL PHASE ANGLE 0°
(SYNCHRONOUS MODE)
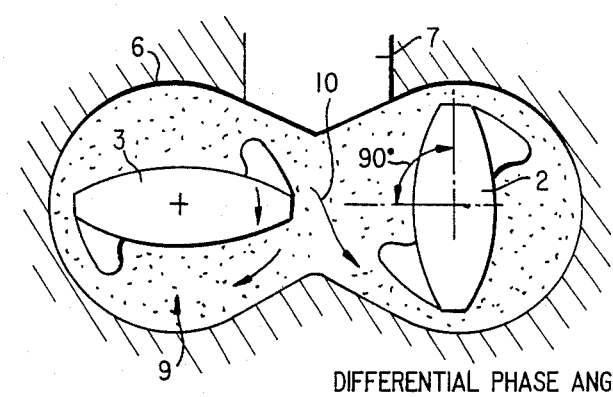
FIG. 2B PRIOR ART  DIFFERENTIAL PHASE ANGLE 90°
(NON-SYNCHRONOUS MODE)
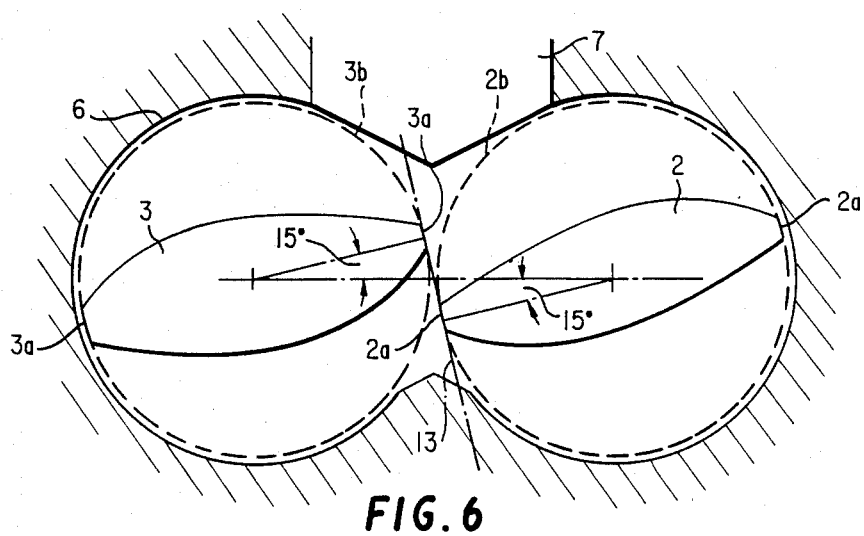
FIG. 6

CLOSED MIXING MACHINE

This is a Continuation-in-Part of U.S. application Ser. No. 06/896,962 filed Aug. 15, 1986, now U.S. Pat. No. 4,718,771.

BACKGROUND OF THE INVENTION

1. Field of the Invention

The present invention relates to a closed mixing machine for mixing a batch of polymeric materials such as rubber and plastic particles, and more particularly an improved mixing machine having non-intermeshed rotors which rotate at a predetermined rotation ratio and a predetermined phase angle of rotor tips for performing an improved macro-dispersion.

2. Description of the Prior Art

A batch type mixer is widely used for performing batch mixing of polymeric materials such as rubber and plastic particles, particularly in the tire manufacturing industry for preparing initial materials of the tires. Generally, there are two types of mixers used for those purposes; non-intermeshed rotor type and intermeshed rotor type.

FIG. 1(A) of the accompanying drawings shows a mixer of the former type in cross section. The mixer includes a casing 1 defining therein a pair of parallel mixing chambers 6,6 communicating with each other and closed at opposite ends thereof, and a pair of rotors 2,3 disposed in the chambers and spaced from each other. The casing 1 also has an inlet port 8 formed in the upper wall thereof at its center portion for introducing the material thereinto, in which port a ram 7 is disposed and closes the same. Each of the rotors has a number of helical rotor vanes extendng axially therearound. The rotors perform the mixing of a batch of the material charged thereinto via the port 8 as the rotors rotate. A mixer of an intermeshed rotor type shown in FIG. 1(B) has a construction similar to the mixer of FIG. 1(A) except in that a pair of rotors 2,3 are intermeshed with each other.

It is well known that the material undergoes basic processes consisting of macro-dispersion (distributive mixing) and micro-dispersion (shear mixing) during the batch mixing. Macro-dispersion is mainly caused by an axial drag flow created by the helical vanes of the rotors 2,3 rotating in the chamber and also by a transverse flow from one chamber to the other. On the other hand, micro-dispersion is mainly caused by a strong shearing force of the rotors 2,3 acting on the material moving transversely of the rotor axis. Due to the demand of users of the mixer, there are needs for reducing the mixing time for improvement of productivity, dispersing effectively the required additives for an improvement of quality in the mixing, and deterring a variance in quality for even or homogeneous mixing. In order to cope with those demands, various considerations have been taken into account for improving macro- and micro-dispersion. To this end, U.S. Pat. No. 3,403,894, British Patent No. 2024635A, Japanese Patent Application Nos. 53-76686, 53-76688, 54-61917, and 55-18335, for instance, disclose proposals for the shape, length and helix angle of the rotor vane, and the shape and diameter of the rotor and mixing chamber.

The mixer of FIG. 1(A) is advantageous in that since a space intercommunicating between the two chambers 6,6 beneath the ram 7 is wide enough to facilitate introduction of the material into the chambes, the shearing action occurs rapidly in comparison with the mixer of the intermeshed rotor type and thus achieves a high productivity. The mixer with the non-intermeshed rotors often operates at different rotor rotation speed, i.e., at a rotation ratio of 1.1 to 1.2, in which one of the rotors rotates faster than the other. The mixer of this type effects a rapid introduction of material and an increased degree of micro-dispersion when the two rotors 2,3 move into a synchronized mode where a phase angle of the rotor tips is 0 degrees as shown in FIG. 2(A). In this mode, the material 9 flows in a direction indicated by an arrow 10 at increased rate of material inclusion. In a non-synchronized mode as shown in FIG. 2(B), for instance, where the phase angle is 90 degrees, an increased degree of macro-dispersion is effected as the material 9 flows between the two chambers in an effective manner. To achieve a further improvement in productivity of this type of mixer, another modification has been made by increasing the number of rotor vanes (i.e. quadruple-vane) and /or rotor rotation speed. With those modifications, however, the variance in quality of the mixed material has been objectionably increased.

The inventor of the present invention has conducted research into the causes of the foregoing drawbacks by testing a simulation mixing machine I and a batch type mixer of 16 liters in capacity. The simulation machine I has mixing chambers having an inside diameter of 200 mm and a length of one third the length of normal chambers. Windows are provided in the wall of the chambers for observing the behavior of the material. One of the two rotors rotates faster than the other. As a result, it has been proved that a substantial variance in the temperature of the material occurs between the two chambers 6,6. The temperature of the material in one chamber in which the rotor rotates faster was higher by 10 degrees at maximum than that in the other chamber. The variance of the material temperature means that flow of the material from one chamber to the other takes place only insufficiently and hence the differential mixing energy, which is created by the two rotors rotating at different speeds in the two chambers, is not appropriately overcome or offset. In other words, the mixing quality of the material in the two chambers are not balanced. It has been also proved through analysis of the material in the chambers that a layer of the material 11, 12 sticks to the inner periphery of the chambers 6,6 except for an end face of the ram 7 and also on the surfaces of the rotors 2,3 as shown in FIG. 3. The material 11,12 which sticks have a viscosity which is different from that of the remaining material 9 ($\pm 10$ points at maximum of Mooney viscosity ). Sticking of the material takes place because the temperature of the material 9 is decreased enough to increase the viscocity and thus to deter the flow of the material when the latter comes in contact with the cooled surfaces of the metaric chambers 6. Obviously, the layers of sticking material 11,12 are replaced by the remaining material 9 only insufficiently. It is apparently understood from the research that the drawbacks of the known mixer will be overcome by further enhacing its macro-disperson, and more specifically by enhancing the replacing of the sticked material 11, 12 with the remaining material 9 and also inter-chamber flow of the material.

SUMMARY OF THE INVENTION

It is therefore an object of the present invention to provide an improved closed mixing machine or mixer with a pair of rotors being non-intermeshed with each other, in which the rotorsrotate at a prdetermined rotation rate and predetermined phase angle so as to enhance macro-dispersion of the material.

A more specified object of the invention is to provide a closed mixing machine including a pair of intercommunicated chambers defined in a casing and closed by opposite end frames and a pair of parallel spaced rotors rotatable in opposite directions in the chambers, in which the two rotors rotate at the same speed and the phase angle of rotor tips disposed at an axially central portion thereof is set to be 0±45 degrees inclusure.

According to the present invention, a closed mixing machine includes a casing defining a pair of chambers provided with end frames closing the latter at their ends, a pair of parallel non-intermeshed rotors disposed within the chambers and adapted to rotate in opposite directions, wherein the rotors have a differential rotation ratio of 1.0, and respective rotor tips set in position so as to have a differential phase angle of 0±45 degrees inclusive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2(A) and 2(B) are explanatory views of the known mixing machine, showing positions of the two rotors and flow of the material in synchronous and non-synchronous modes, respectively;

FIG. 6 is a cross-sectional view of a mixing machine according to the present invention;

DESCRIPTION OF THE PREFERRED EMBODIMENTS

Figure 4:
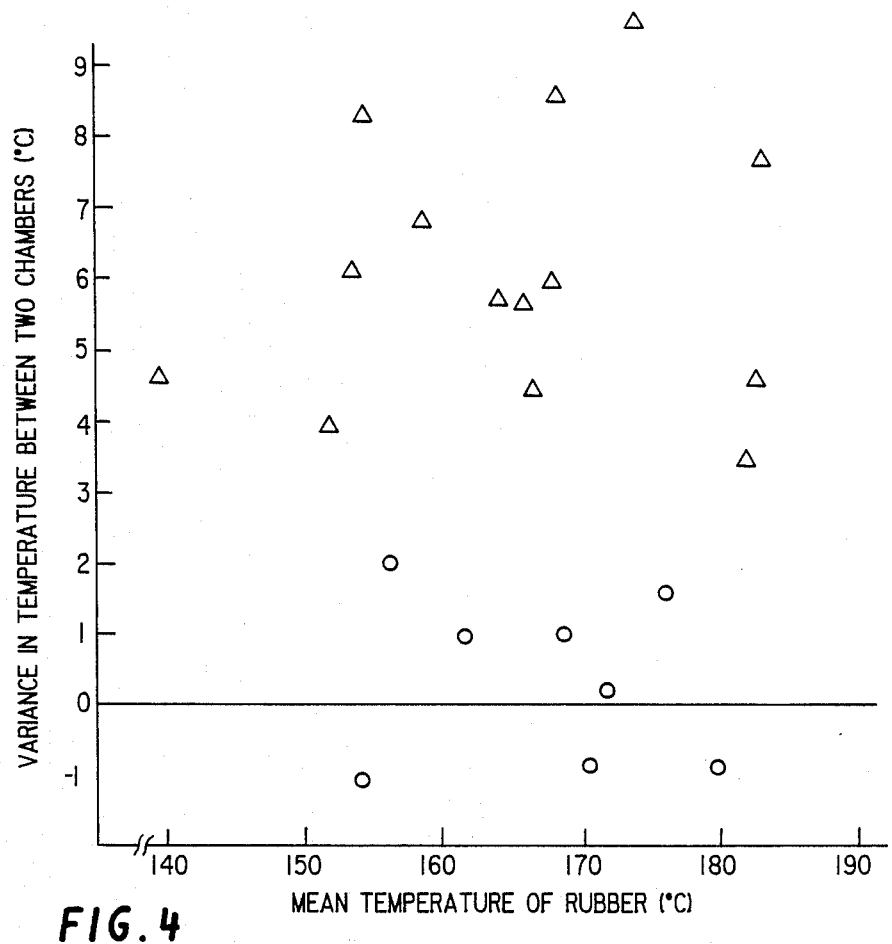
FIG. 4 is a chart showing a variance in temperature of the material between the two cahmbers.

As is known from the results of the above-described test, a variance in temperature of the material 9 between the two chambers 6,6 takes place due to the insufficient movement or flow of the material 9 from one chamber to the other and vice versa, and also, but mainly due to differntial mixing energy acting on the material 9 created by the two rotors 2,3 which rotate at different speeds in the two chambers 6,6. It is therefore understood that such an objectionable variance is eliminated or at least reduced to a minimal extent by making the two rotors 2,3 rotate at the same speed, i.e. a differential rotation speed of 1.0. FIG. 4 is a chart showing the results of the test made on the simulation mixing machine I, in which chart the horizontal axis represents the mean temperature of the material 9 (i.e. rubber) and the vertical axis represents variance in temperature of the material 9 between the two chambers 2,3. The symbols Δ (triangle) and o (circle) denote results obtained from the differential rotation speed mode and the synchronized mode respectively. The temperature variance of the material between the two chambers are allocated near a zero degree level with the synchronized mode.

Figure 1A:
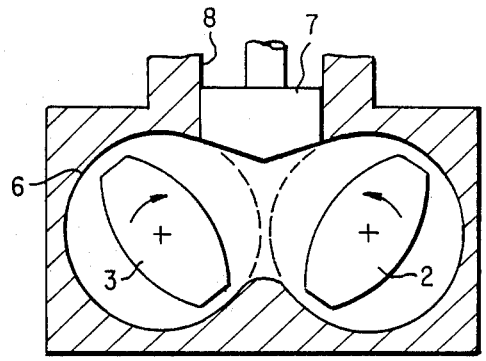
FIG. 1(a) is a transverse cross-sectional view of a known mixing machine a non-intermeshed rotor type.
Figure 1B:
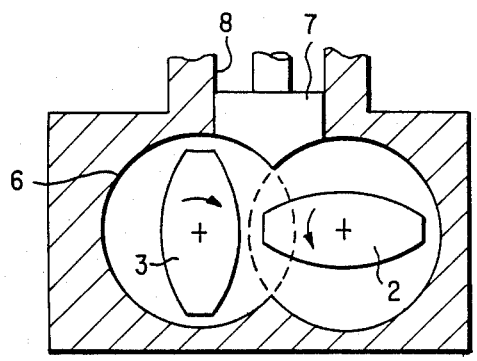
FIG. 1(B) is a transverse cross-secitonal view of the known mixing machine of an intermeshed rotor type.
Figure 3:
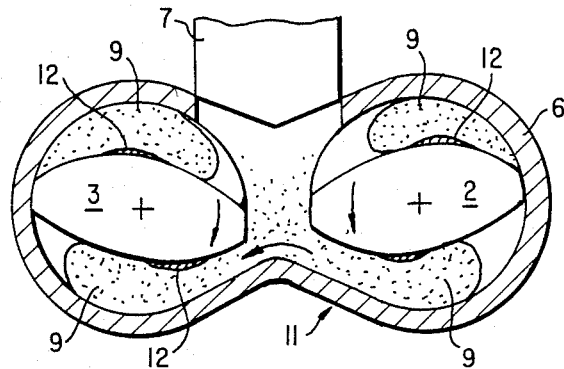
FIG. 3 is an explanatory view of the mixing machine showing the manner in which layers of sticking material are formed.

The foregoing test results also indicte that the problem with regard to sticking of the layers of material 11,12 (FIG. 3) to the inner wall of the mixing chambers 6,6 and the surfaces of the rotors 2,3 is overcome by setting the rotors to rotate at an equal rotation speed and also by adopting about 0 degree of the phase angle of the rotor tips at an axially central portion thereof.

Figure 5:
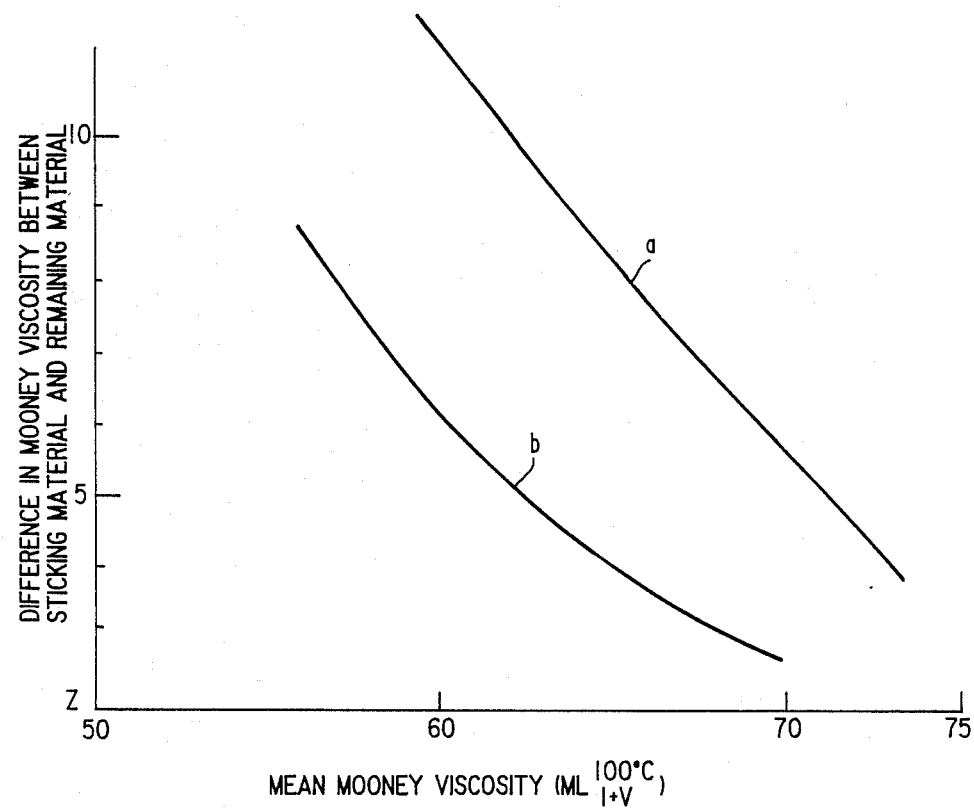
FIG. 5 is a chart showing a variance in Mooney viscosity between the sticking material and the remaining material.

FIG. 5 also indicates the test results of the simulation mixing machine I, in which figure the horizontal axis represents mean Mooney viscosity while the vertical axis represents variance in viscosity between the sticking material 11,12 and the remaining material 9. Line a represents a result of the differential rotor rotation mode in which the two rotors operate at a differential rotation speed of 1.15, and line b represents a result of the synchronized mode with the phase angle of 0 degree degrees. In the former mode, the variance in Mooney viscosity is substantially great. On the other hand, in the latter mode, the variance is smaller than that of the former mode. This means that replacement of the sticking material 11,12 by the remaining material 9 occurs frequently or to a large extent, thus deterring sticking of the material to the components of the mixing machine.

Figure 8:
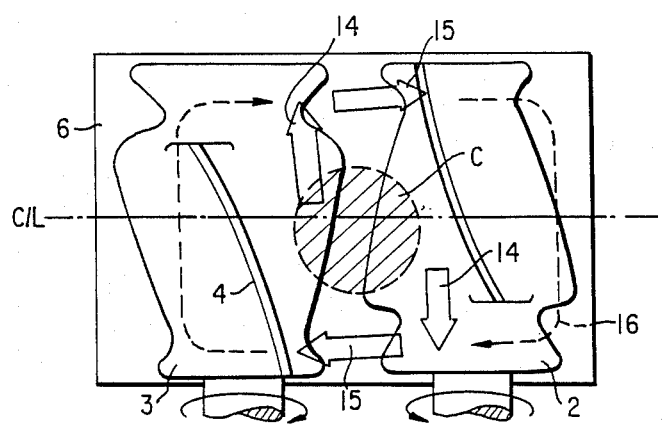
FIG. 8 shows the flow of material in accordance with the present invention.

In the latter mode, the two rotors, when positioned with the vane tips being at phase angle of 0 degree as shown in FIG. 2(A), drag or rake a material portion disposed just below the end face of the ram 7 in a cooperative manner without letting some escape therefrom to a substantial extent, whereupon the material portion is subject to an increased compressive force caused thereon jointly by the end face of the ram and curved front faces of the rotors 2,3. The material portion located in a region indicated by reference numeral C in FIG. 8 is under such an increased compressive force.

The differential phase angle of the rotor tips is not necessarily limited to 0 degrees, inasmuch as the two rotors 2,3 could cooperate to exert dragging of the material portion. As shown in FIG. 6, it is understood that the cooperative drag of the rotors 2,3 takes place as far as the phase angle of the rotors is determined such that a tangent of one rotor tip 2a overlaps a tangent of the other rotor tip 3a. From this point of view, the maximum differential phase angle of the rotor tips of the mixing machine according to this embodiment is approximately 30 degrees. In other words, the differential phase angle is determined such that the material drag directions of the two rotors 2,3 overlap each other. The material drag direction is equal to the tangent of rotor tip circle 2b (3b) of the the rotor tip 2a (3a), and is indicated by line with an arrow head 13.

In order to avoid deterioration of the inter-chamber flow and the mixability of the material which could be caused by adopting an equal rotor rotation speed, the most suitable value for the differential phase angle must be chosen. To this end, the applicant made another test by using a simulation mixing machine II. The simulation machine II includes a transparent casing of acrylic resin defining a pair of mixing chambers of 1.6 liters in capacity so that flow of the material in the chambers can be observed from outside. A predetermined amount of colored plastic beads or test particles are added to the material to be mixed. Mixing the same material containing the beads is repeated at a varied differential phase angle of the rotor tips at the central portion of the chambers. After mixing of the material is completed, sampling of the mixed material is carried out at 27 points in the region of the chambers, and then the number of the beads contained in the sampled material portions is counted for researching the mixability in view of variance in number $\delta_{n-1}$ of the test particles.

Figure 7:
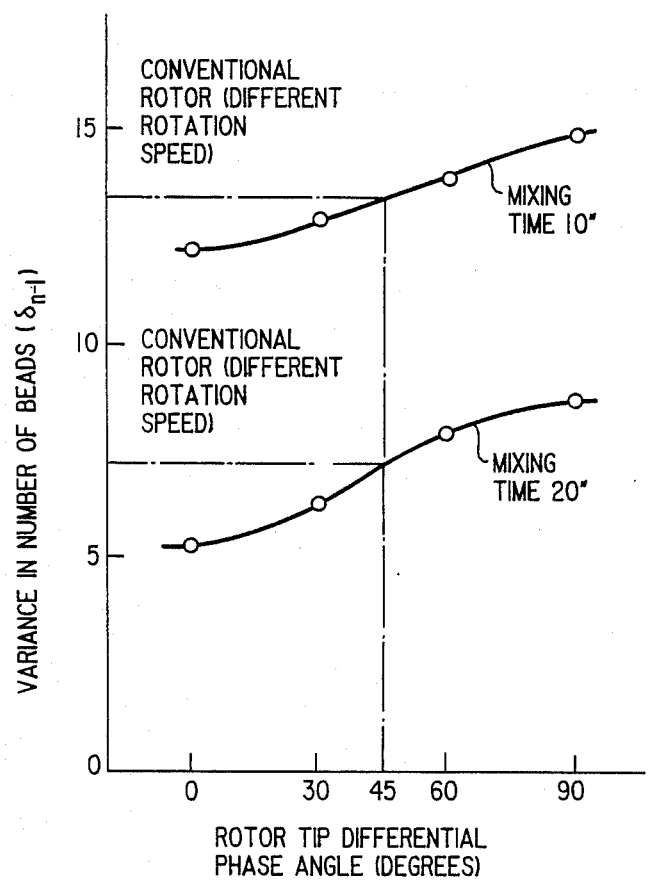
FIG. 7 is a chart showing a relation between a phase angle of a two rotors of synchronized mode and a variance in dispersion of test particles.

FIG. 7 shows the result of the test made with the simulation machine II, in which the horizontal axis represents the differential phase angle and the vertical axis represents the veariance in number of the beads $\delta_{n-1}$. As is known from FIG. 7, the closure the differential phase angle comes close to 0 degrees, the smaller the variance $\delta_{n-1}$ the beads becomes, thus resulting in an improved mixability. It is also shown that the present mixing machine of the equal rotation speed mode exhibits a higher mixability than the conventional machine of the different rotation speed mode, inasmuch as the differential phase angle of the machine is set to be smaller than 45 degrees. With the smaller value of the differential phase angle, the material portion disposed beneath the ramend face is dragged with the increased compressive force, which force increases the axial flow rate of the material. The increase of the axial flow rate in turn promotes the material to flow from one chamber to the other at the ends of the rotors, with the result that the material is encouraged to circulate effectively throughout the entire space of the chambers. FIG. 8 shows the flow of the material 9. An arrow 14 indicates the axial flow of the material, and arrows 15 and 16 indicate inter-chamber flow and circulation of the material 9 respectively.

Figure 10:
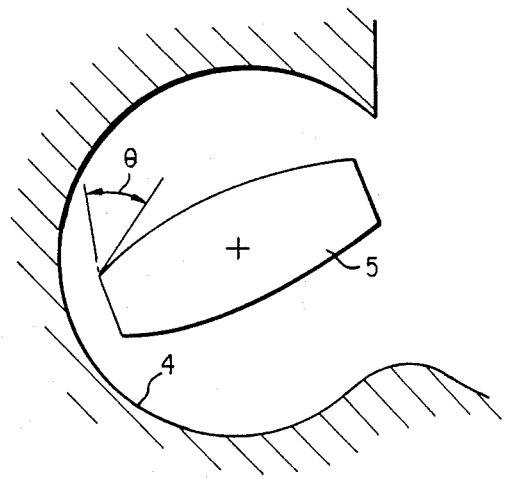
FIG. 10 is a view showing a position of the rotor in the chamber.
Figure 11:
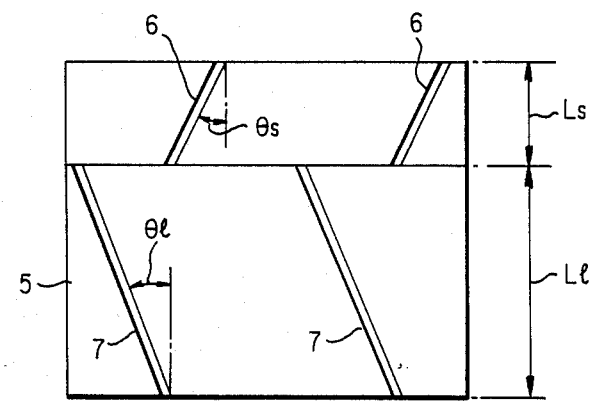
FIG. 11 is an expansion view of the rotor vane.

With the above-described arrangement of the mixing machine, an effective flow of the material is achieved. More specifically, the variance in temperature of the material between the two chambers and hence the attachment of the material to the components of the mixing machine are overcome by providing the two rotors 2,3 of the equal rotation speed mode (i.e. 1.0 in differential rotation ratio) and setting the differential phase angle of the rotor tips in a range of 0±45 degrees inclusive, preferably 0±30 degrees. As a result, the mixing machine is considerably improved in view of its macro-dispersion. The principle of the present invention is applied to the batch type mixing machine regardless of the number of rotor vanes, i.e. twin-vane or quadruple-vane. It is preferable that the present invention is applied to the mixing machine having non-intermeshed rotors wherein the rotor length/chamber diameter ratio is 1.2 to 2.2, the rotor front or inclusion angle $\theta$ is 15 to 35 degrees, the rotor vane length ratio Ls/L1 is 0.1 to 0.48, the rotor helix angles $\theta_1$, $\theta_s$ of the longer and the shorter vanes are most suitably 20 to 45 degrees, and 0 to 45 degrees, respectively. Reference is made to FIGS. 10 and 11 for those signs; $\theta$, Ls and L1, $\theta_1$ and $\theta_s$.

EXAMPLE

Figure 9:
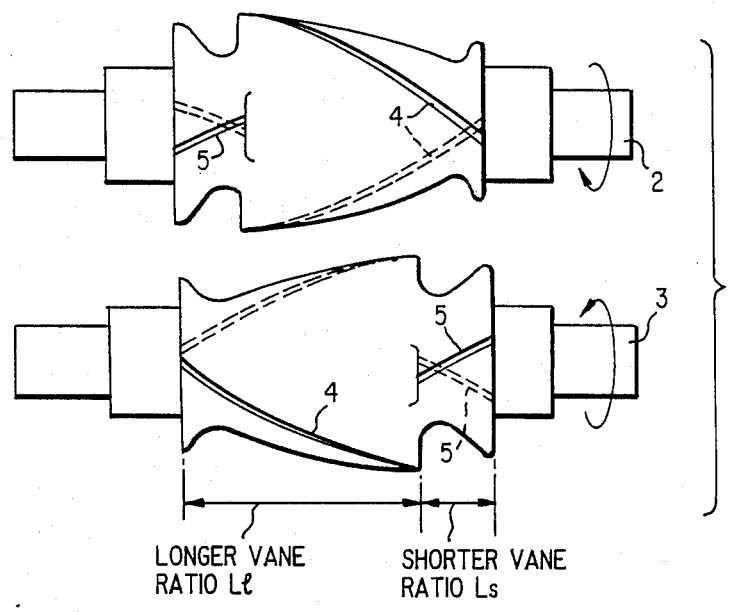
FIG. 9 is a plan view of the rotors according to an embodiment of the invention.

Using mixing machines of a non-intermeshed rotor type having a mixing chamber of 1.6 liters in capacity and a pair of rotors of quadruple-vanes consisting of two pairs of longer and shorter vanes 4,5 shown in FIG. 9, comparison has been made between the present machine of the equal rotation speed mode (1.0 in differential rotation ratio) and a conventional machine of the different rotor rotation speed mode (1.5 in differential rotor rotation ratio). The differential phase angle of the rotor tips is set at 0 degree at the central portion of the chambers in the case of the equal rotation speed mode. Break-down mixing of natural rubber and master batch mixing were carried out. Portions of the mixed material were sampled out of the chambers at five points to research the variance $\delta_{n-1}$ in Mooney viscosity of the material portions. In the mixing machine acoording to the present invention, the variance in Mooney viscosity $\delta_{n-1}$ of the break-down mixing have been reduced by 50% and 35%, respectively. Accordingly, it is confirmed that an improved macro-dispersion has been achieved by the present mixing machine.

The present invention thus provides a mixing machine of non-intermeshed rotor type having a predetermined differential rotation ratio and a predetermind differential phase angle of the rotor tips, in which the differential rotation ratio and the differential phase angle are determined such that its macro-dispersion is considerably improved. The present mixing machine is advantageous in that it meets the industrial demands of improved productivity, improved quality of the mixed material and even or homogeneous mixing without changing the dimension and the shape of the components of the mixing machine.

Obviously, numerous modifications and variations of the present invention are possible in light of the above teaching. It is therefore to be understood that within the scope of the appended claims, the invention may be practiced otherwise than as specifically described herein.

What is claimed is:
1. A closed mixing machine, comprising:
a casing defining therein a pair of chambers provided with end frames closing said chambers at end portions thereof; and
a pair of non-intermeshed rotors mounted on parallel axes disposed within the chambers and adapted to rotate in opposite directions; each said rotor having tips which extend along the length of said rotor and on substantially opposite sides of said rotor, said rotors having a differential rotation ratio of 1.0, said rotor tips being set in position so that a differential phase angle of the rotor tips at an axially central portion thereof of 0±up to 45 degrees is obtained.
2. A closed mixing machine according to claim 1, wherein the rotor has a vane of a predetermined length and a rotor helix angle and wherein a rotor length/chamber diameter ratio of 1.2 to 2.2, a rotor inclusion angle is 15 to 35 degrees, a ratio of rotor vane length is 0.1 to 0.48, and said rotor helix angle is 20 to 45 degrees.
3. A closed mixing machine according to claim 1, wherein the rotor has a vane of a predetermined length and a rotor helix angle and wherein a rotor length/chamber diameter ratio is 1.2 to 2.2, a rotor inclusion angle $\theta$ is 15 to 35 degrees, a ratio of rotor vane length is 0.1 to 0.48, and said rotor helix angle is 0 to 45 degrees.

* * * * *